US010622176B2

(12) United States Patent
Volkmann et al.

(10) Patent No.: US 10,622,176 B2
(45) Date of Patent: Apr. 14, 2020

(54) HIGH VOLTAGE ELECTRIC LINE CUTTER DEVICE

(71) Applicant: Key Safety Systems, Inc., Sterling Heights, MI (US)

(72) Inventors: Matthias Volkmann, Kronberg (DE); Martin Pieruch, Hochheim (DE); Heiko Struss, Holzhausen a.d. Haide (DE); Alois Mauthofer, Alzenau (DE)

(73) Assignee: Key Safety Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/150,486

(22) Filed: Oct. 3, 2018

(65) Prior Publication Data

US 2019/0108957 A1    Apr. 11, 2019

Related U.S. Application Data

(60) Provisional application No. 62/570,978, filed on Oct. 11, 2017.

(51) Int. Cl.
*H01H 39/00* (2006.01)
*H01H 71/02* (2006.01)
(Continued)

(52) U.S. Cl.
CPC ........... *H01H 39/006* (2013.01); *B23D 15/14* (2013.01); *B23D 15/145* (2013.01);
(Continued)

(58) Field of Classification Search
CPC .... H01H 39/006; H01H 71/025; H01H 11/00; H01H 71/02; H01H 50/546;
(Continued)

(56) References Cited

U.S. PATENT DOCUMENTS 2,936,331 A * 5/1960 Sillers .................. H02G 5/025
174/171
3,003,045 A * 10/1961 Tichenor ................ H01H 3/00
200/296
(Continued)

FOREIGN PATENT DOCUMENTS

| CN | 104698972 | 6/2015 |
|---|---|---|
| DE | 102015204028 | 9/2015 |
| JP | 2002512422 | 4/2002 |

*Primary Examiner* — Anatoly Vortman
(74) *Attorney, Agent, or Firm* — Meunier Carlin & Curfman LLC (57) ABSTRACT

An electric line cutter device for high voltage busbars has a two-part housing, a piston, an igniter and a busbar. The upper housing includes a cylinder, cuboid or prism chamber. The lower housing also includes a cylinder, cuboid or prism chamber. The piston is contained inside one of either the upper housing chamber or the lower housing chamber. Upon igniting the igniter, the piston breaks a portion of the busbar moving the piston and the portion of the busbar into the opposite chamber thereby stopping the electric current flow. The piston is at least partially formed as an insulator to prevent electric discharge. The piston design together with chamber design includes integrated "squeeze areas" and "blow channels" for the appearing arc. A channel system outside or from inside the piston allow the pyro gases to push the arc plasma into a filter system to cool down the gases.

13 Claims, 13 Drawing Sheets

(51) Int. Cl.
*H01H 50/54* (2006.01)
*B23D 15/14* (2006.01)
*B60L 3/04* (2006.01)
*H02B 1/20* (2006.01)
*B60L 3/00* (2019.01)

(52) U.S. Cl.
CPC .............. *B60L 3/0007* (2013.01); *B60L 3/04* (2013.01); *H01H 50/546* (2013.01); *H01H 71/02* (2013.01); *H02B 1/20* (2013.01); *H01H 2039/008* (2013.01)

(58) Field of Classification Search
CPC . H01H 2039/008; B60L 11/1851; B60L 3/04; H02B 1/20; B23D 15/14
USPC ........................................................ 337/157
See application file for complete search history.

(56) References Cited

U.S. PATENT DOCUMENTS

| | | | |
|---|---|---|---|
| 3,277,255 A | 10/1966 | Mattsson et al. | |
| 3,393,605 A * | 7/1968 | Parnell ................... | B63G 7/02 30/180 |
| 3,848,100 A * | 11/1974 | Kozorezov .......... | H01H 39/006 200/61.08 |
| 3,873,786 A * | 3/1975 | Lagofun .............. | B23D 15/145 200/61.08 |
| 4,224,487 A | 9/1980 | Simonsen | |
| 4,417,519 A * | 11/1983 | Lutz ..................... | H01H 39/004 102/263 |
| 5,535,842 A | 7/1996 | Richter et al. | |
| 5,877,563 A * | 3/1999 | Krappel ............... | H01H 39/006 180/271 |
| 6,194,988 B1 * | 2/2001 | Yamaguchi .......... | H01H 39/006 180/279 |
| 6,232,568 B1 * | 5/2001 | Hasegawa ............ | H01H 39/006 200/61.08 |
| 6,411,190 B1 * | 6/2002 | Yamaguchi ........... | H01H 39/00 180/279 |
| 6,556,119 B1 | 4/2003 | Lell | |
| 6,843,157 B2 | 1/2005 | Hamilton et al. | |
| 7,078,635 B2 * | 7/2006 | Kordel ................. | H01H 39/006 200/61.08 |
| 7,123,124 B2 * | 10/2006 | Caruso ................. | H01H 39/006 337/157 |
| 7,205,879 B2 * | 4/2007 | Kordel ................. | H01H 39/006 337/157 |
| 7,222,561 B2 | 5/2007 | Brede et al. | |
| 7,239,225 B2 * | 7/2007 | Tirmizi ................ | H01H 39/006 337/157 |
| 7,511,600 B2 * | 3/2009 | Von Behr ............. | H01H 39/006 200/61.08 |
| 8,653,386 B2 | 2/2014 | Ukon et al. | |
| 9,153,402 B2 | 10/2015 | Ukon et al. | |
| 9,221,343 B2 * | 12/2015 | Tokarz ................. | B60L 3/0046 |
| 9,236,208 B2 * | 1/2016 | Ukon ................... | H01H 39/006 |
| 9,324,522 B2 | 4/2016 | Nakmura et al. | |
| 9,419,424 B2 * | 8/2016 | Karnbach ............. | H02G 5/025 |
| 2004/0221638 A1 * | 11/2004 | Brede ................... | B23D 15/145 72/326 |
| 2010/0218659 A1 * | 9/2010 | Ukon ................... | H01H 39/006 83/639.1 |
| 2013/0056344 A1 * | 3/2013 | Borg ..................... | H01H 39/00 200/81 R |
| 2013/0263715 A1 | 10/2013 | Ukon et al. | |
| 2014/0118887 A1 * | 5/2014 | Deb ...................... | H02B 13/025 361/622 |
| 2015/0116911 A1 * | 4/2015 | Sharma ................ | H02B 1/565 361/605 |
| 2016/0190777 A1 * | 6/2016 | Faber ................... | H02B 1/565 361/641 |
| 2017/0263403 A1 * | 9/2017 | Marlin ................. | H01H 39/006 |

\* cited by examiner

HIGH VOLTAGE ELECTRIC LINE CUTTER DEVICE

FIELD OF THE INVENTION

The present invention relates to a device for extremely rapid termination of very high voltages and currents. More particularly, a device that upon a sensed signal can disrupt current flow in milliseconds. The device is particularly useful in vehicle crashes, more particularly, electric vehicle crashes. In general, the device also allows for protection from damages and risks by short cuts of high voltage batteries where the device can also be used for stationary batteries, not only for batteries in electric vehicles.

BACKGROUND OF THE INVENTION

The use of hybrid and fully electric powered vehicles means a bank of batteries carrying very high voltages is required. In the event of a vehicle crash, the electrical current flowing from the batteries can become a serious hazard particularly as the current flows can be shorted to electrify a vehicle chassis with very high voltage. This creates a hazard for the occupants as well as emergency personnel responding to the accident. The possibility of electrocution or of the combustion of flammable material is an extreme risk. Ideally, the risk can be minimized if the flow of electricity can be disrupted, preferably near the source or in the case of electric vehicles, near the batteries.

A manual off switch is unreliable for many reasons, because the driver may be incapacitated and emergency personnel may not be able to safely access such a switch.

An object of the present invention is to have the disruption of high voltage electrical currents to occur automatically in the event of a crash and to do so in a very low cost and reliable way to protect the vehicle, its occupants and those emergency personnel responding to the accident.

The disconnection of the electrical currents has to happen in a really short time <2 ms, to avoid any damage of the connected electric system, for instance the onboard electronics of the vehicle. This invention simultaneously extinguishes the electrical arcs caused by a gas flow immediately after cutting the electrical connection while suppressing the heat generated by using the filters to cool and a piston to squeeze the electrical arcs between piston and cylinder.

SUMMARY OF THE INVENTION

An electric line cutter device for high voltage busbars has a two-part housing, a piston, an igniter and a busbar. The first housing includes a cylinder, cuboid or prism chamber. The second housing also includes a cylinder, cuboid or a prism of any other polygonal shape chamber. The second housing is affixed to the first housing. The piston is contained inside one of either the first housing chamber or the second housing chamber. The igniter is for driving the piston from one chamber to the other chamber. The busbar is for carrying an electric current flow. The busbar has a pair of stub ends extending out of the two part housing. The busbar is rigidly held between the first and second housings and spans across said chambers. Upon igniting the igniter, the piston moves and breaks a portion of the busbar moving the piston and the broken portion of the busbar into the opposite chamber thereby stopping the electric current flow. The piston is at least partially formed as an insulator to prevent electric discharge. The first and second housing are made at least partially, if not entirely, non-electrically conductive.

The first and second housing are removably attached to the other by one or more fasteners. The busbar is held rigidly by a compression force between the first and second housing on two opposed sides so the busbar, when broken, has the broken portion of the busbar move while the stub ends of the busbar remain rigidly held at the two opposed sides.

The busbar has the two stub ends extending external of the first and second housings. Each of the stub ends is configured to be attached to electrical wiring or cable to complete a circuit. The busbar further has a pair of fracture locations, each fracture location being internal and adjacent to the first and second housing chambers. Each fracture location is of a reduced thickness when viewed in a cross-section of the busbar. The fracture locations are configured to break upon an impact from the piston.

The igniter is electrically activated in the event of a signal from a sensor. In a preferred embodiment, the electric line cutter device is configured to be used in a vehicle capable of generating high voltages wherein the electric line cutter device is activated by the sensor in the event of a vehicle crash. The igniter preferably is a pyrotechnic device and further comprises a propellant charged squib. The first or second housing further has one or more blow-out vent passages extending from inside the chamber externally out through one of said first or second housings. The electric line cutter device preferably has a filter to capture debris generated during the breaking of the busbar and in particular to cool any hot gases and to deionize the plasma caused by electrical arcing. The filter is made of a high temperature resistant material, preferably, steel or woven steel.

BRIEF DESCRIPTION OF THE DRAWINGS

The invention will be described by way of example and with reference to the accompanying drawings in which.

DETAILED DESCRIPTION OF THE INVENTION

An electric line cutter device 10 for high voltage busbars 2 is illustrated in FIGS. 1-4. The device 10 has a first housing 12 and a second housing 14. Sandwiched between the first 12 and second housing 14 is a busbar 2. The busbar 2 is designed to carry high voltage currents and can be used as a means for carrying power from a battery system to the various components of a vehicle as way of example.

Figure 1:
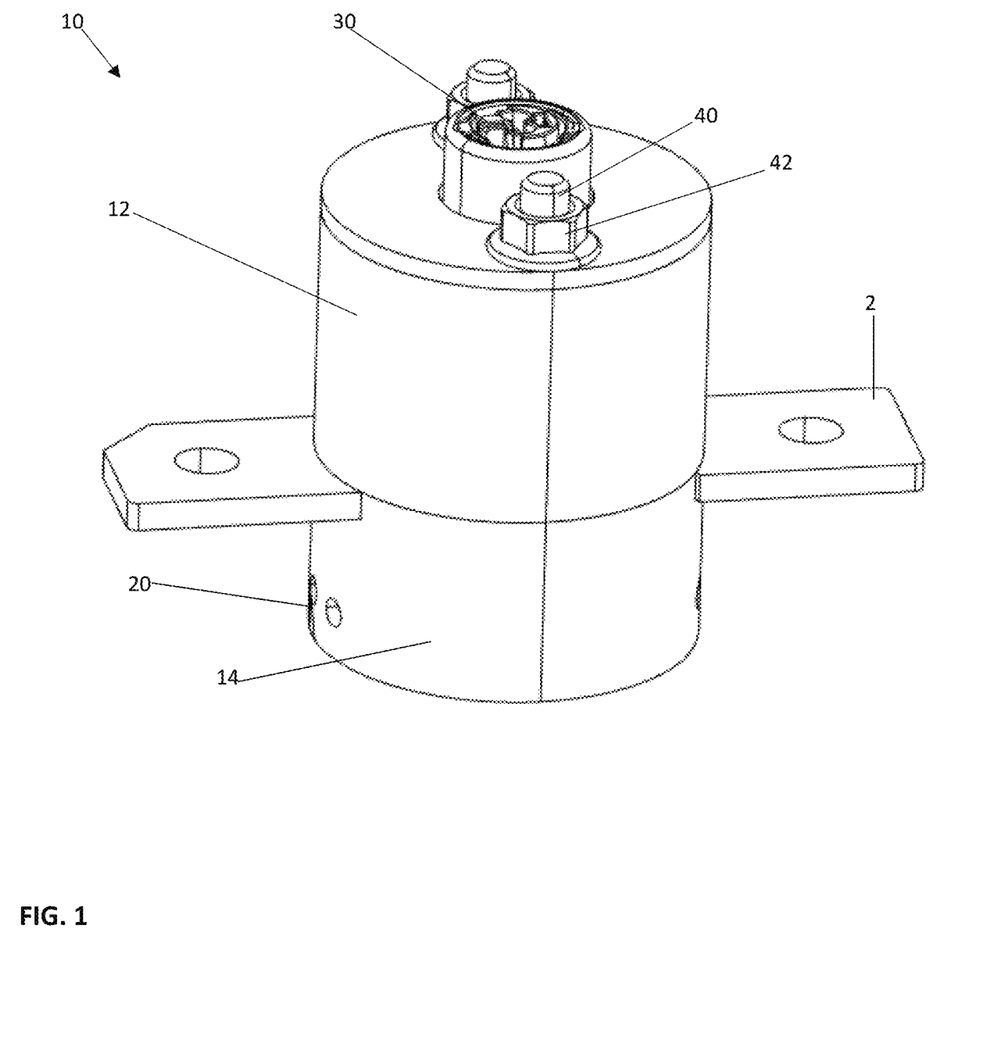
FIG. 1 is a frontal perspective view of the electric line cutter device of the present invention.
Figure 2:
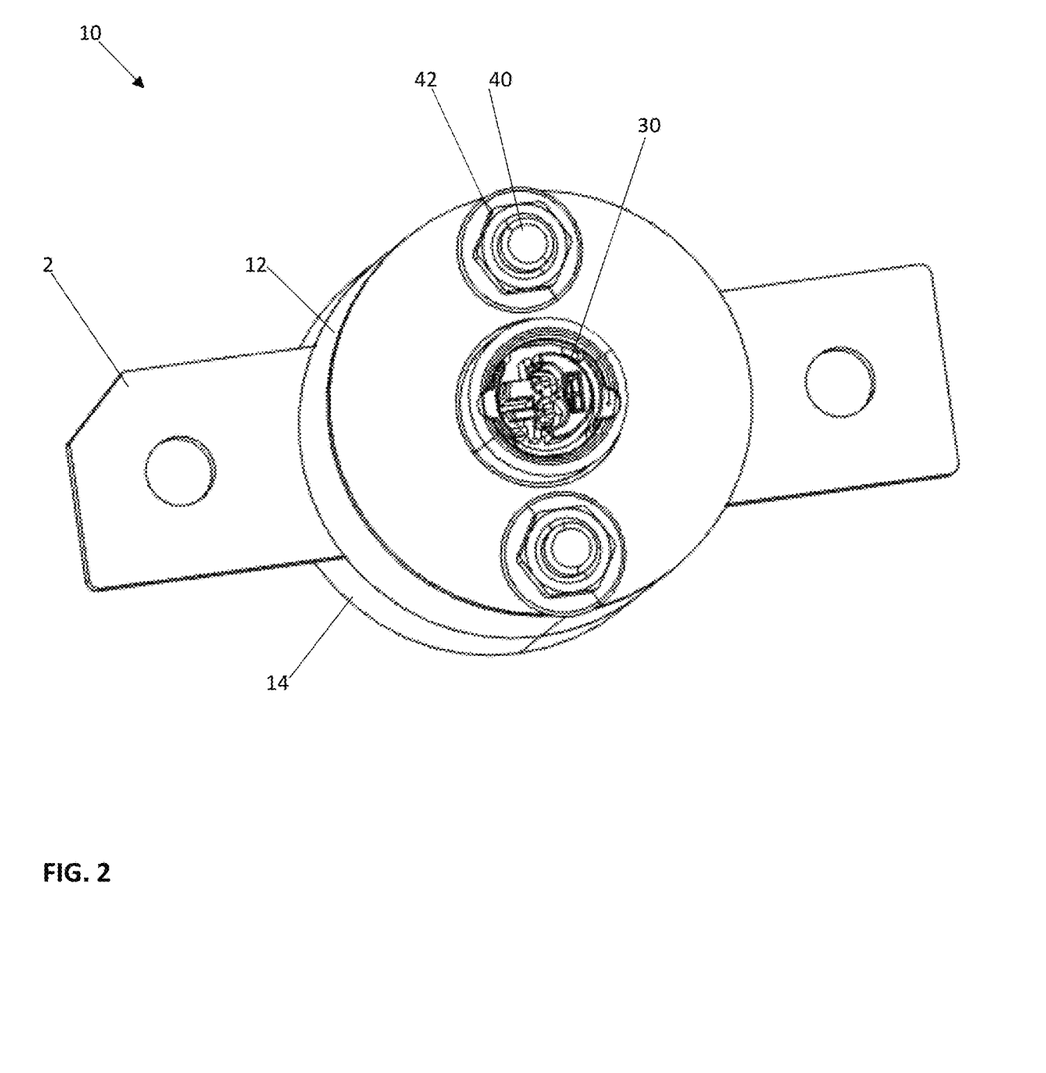
FIG. 2 is a top perspective view of the device of FIG. 1.

Shown at a top portion of the device 10 are electrical connections for an igniter 30. As illustrated in FIG. 1, the two housing parts 12, 14 are held together by fasteners 40 when tightened by threaded nuts 42. This is also illustrated in the cross-sectional view of FIG. 3.

Figure 3:
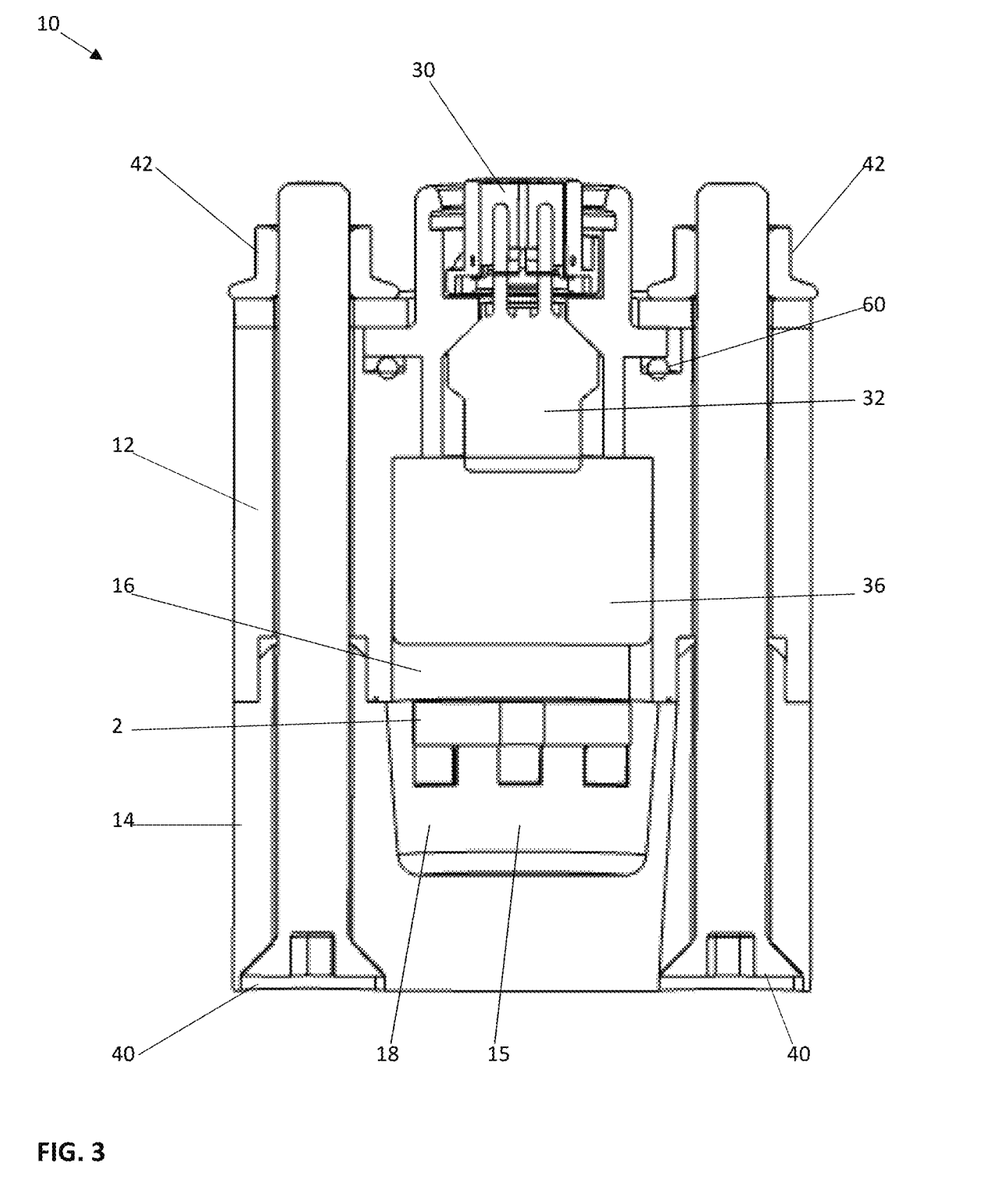
FIG. 3 is a first cross-sectional view of the device of FIG. 1 showing the attachment fasteners.

With reference to FIG. 3, the fasteners 40 when engaging the nut 42 extend through the second housing 14 and first housing 12 and when tightened clamp tightly about the busbar 2. As shown, the igniter 30 is positioned on an O-ring seal 60 and further includes a squib 32 with propellant. This forms a pyrotechnic device that is capable to propel a piston 36 contained within chambers 16, 18. As shown in FIG. 3, the piston 36 is contained in chamber 16 of the first housing 12. The chamber 18 the second housing 14 is shown with a slight inward taper 15, as illustrated in FIG. 3. When the igniter 30 is activated by an electronic signal sent from a vehicle crash detection system 50 such as an Airbag Electronic Control Unit/Airbag ECU", if an airbag sensor doesn't exist, then it's a crash sensor/acceleration sensor, the squib 32 fires the propellant and propels the piston 36 toward the busbar 2. If there is a fire in the vehicle, the busbar can be cut when the cutter gets a defined signal. A pyrotechnical actuator separates electric high voltage battery connection in an electric vehicle irreversibly from the drive train. It is triggered by the Airbag ECU in case of a crash to prevent electric shock hazards or fires due to overcharge of battery or short circuits within the system. The ignitor 30 receives a certain current of for example, 1.75 A for a certain time, such as 500 msec.

Figure 4:
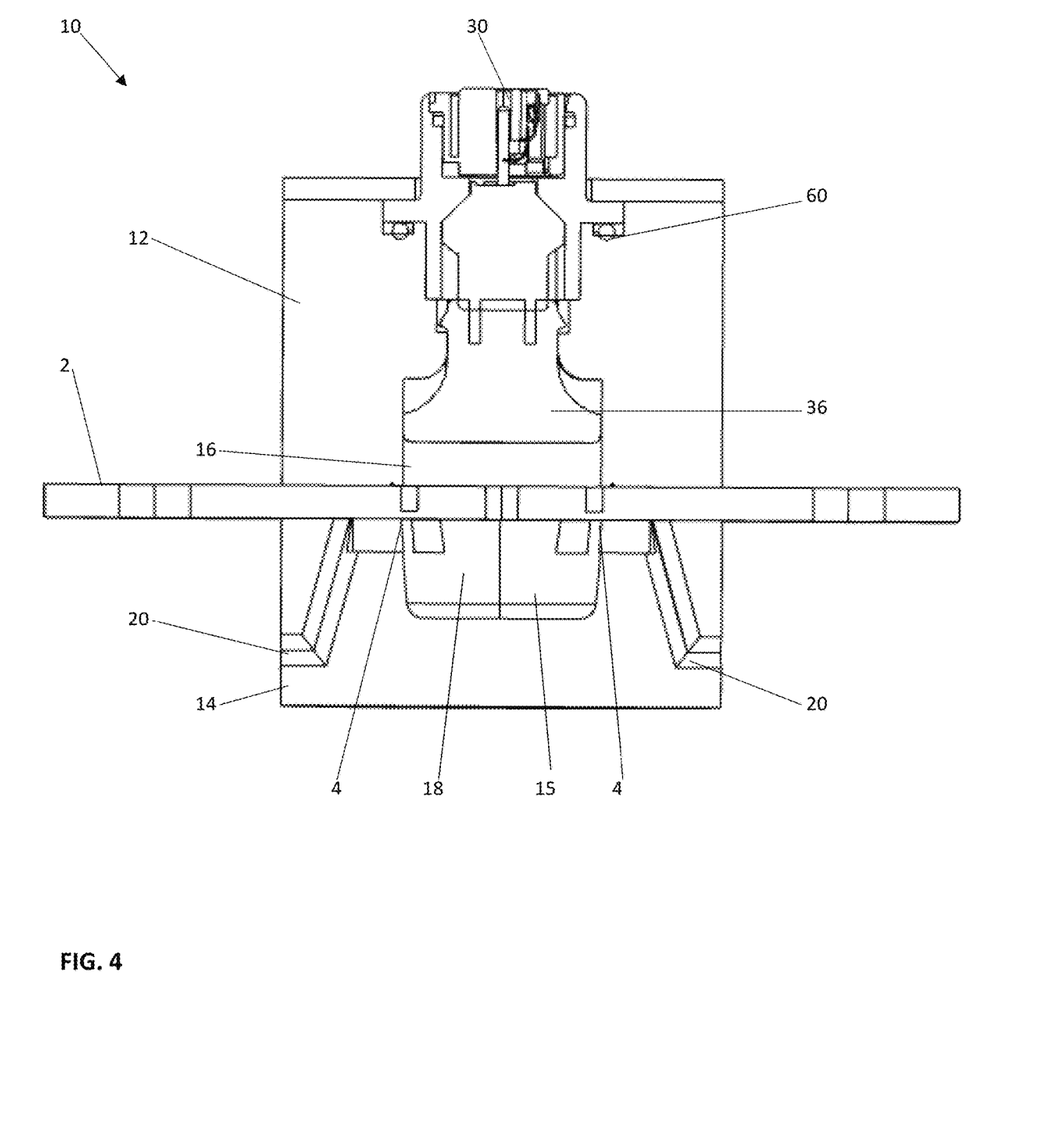
FIG. 4 is a second cross-sectional view showing the busbar being rigidly held.
Figure 5A:
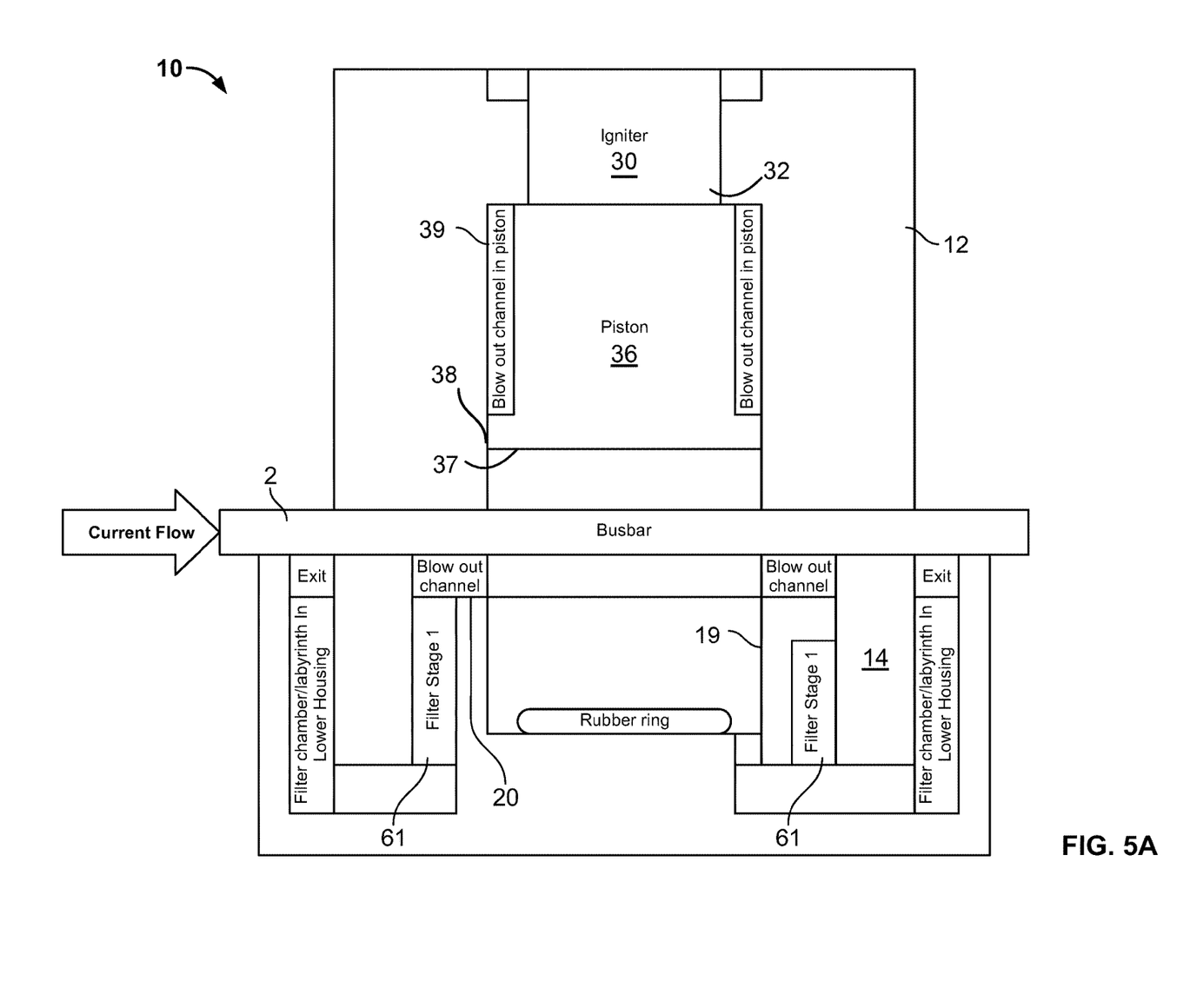
FIG. 5A is a schematic view of the device showing the busbar in closed mode allowing current flow.
Figure 5B:
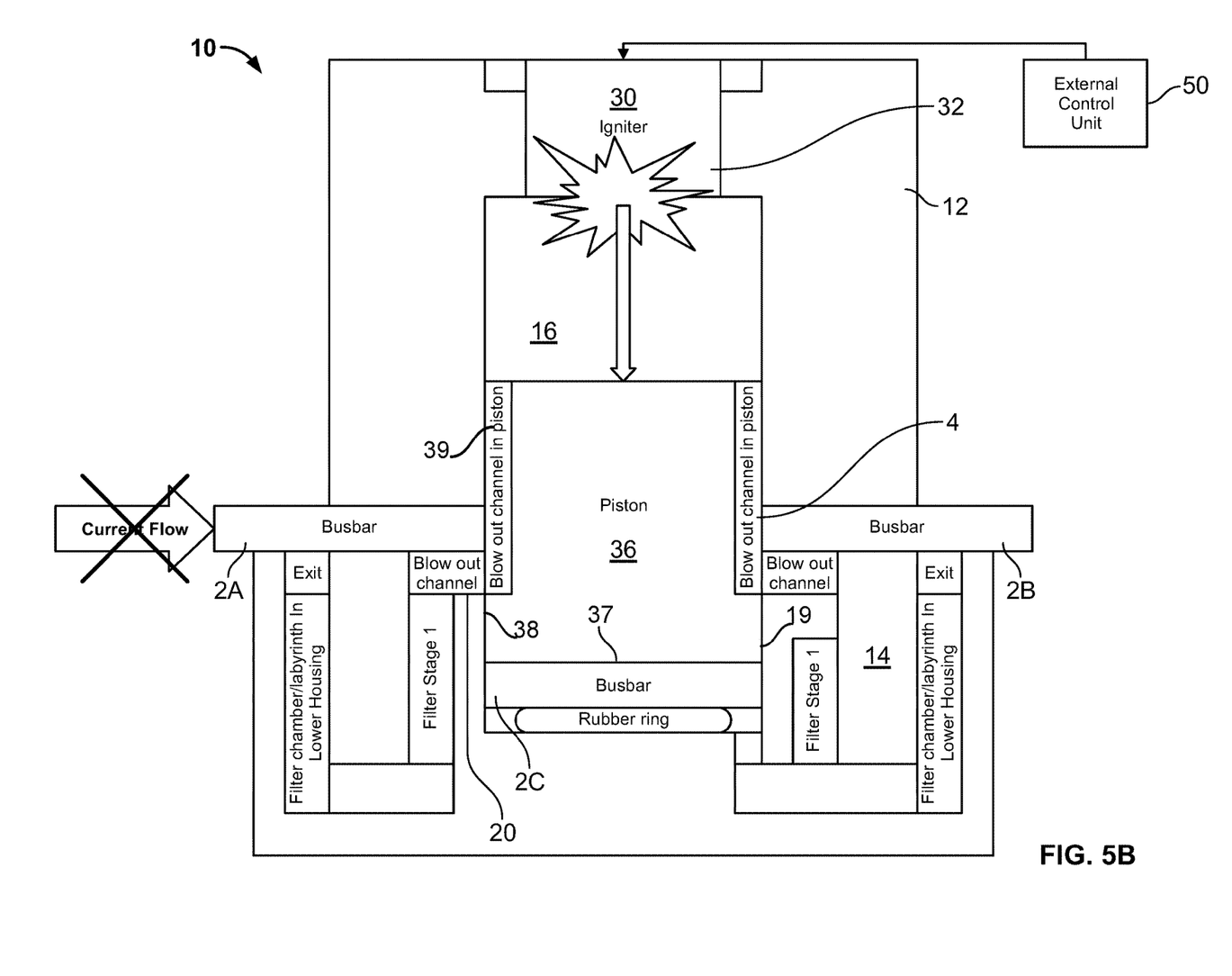
FIG. 5B is a schematic view of the device showing the busbar in open mode disrupting current flow.

The busbar 2, as illustrated in FIG. 4, has a pair of fracture locations 4 on each side of the busbar 2. These fracture locations 4 are reduced thickness sections of the busbar 2 capable of carrying the current, but providing a means of fracturing the busbar 2 parts thereby disrupting the current flow, best illustrated in FIG. 5B. Under normal operating conditions, the busbar 2 is a continuous piece, however, during a vehicle crash, the igniter 30 receives a specific signal from a crash detection system 50 or from another control unit such as the safety computer or airbag ECU, preferably an airbag crash detection system and is activated. When this occurs, the piston 36 is driven downward into the chamber 18 as will be discussed later. During this fracturing of the busbar 2 and disruption of the current, arcs can occur. These arcs create discharges and gas discharges inside the electric cutter device 10, as such these gases can be dispelled through passages 20 that create open vent passages to allow the gas to discharge. The piston 36 is made of non-conductive material, typically plastic or ceramic. The piston 36 has several functions: Transformation of the gas pressure from the igniter 30 into kinetic energy of the piston 36; Cutting of the busbar and surrounding electrical insulation thereby separating the two busbar stub ends 2A, 2B after cutting; Division of the current into two separate current flows and electric arcs; Extension of the arcs by moving the cut-out busbar part 2C away from the powered stub ends 2A, 2B.

The object of the present invention is to be able to switch off very high currents up to 16 kA and voltages up to 1000 V in a very small space in a very short time <2 msec.

The task is solved by a galvanic separation of a busbar 2 using a pyrotechnic device such as the igniter 30, including a squib 32, and the piston 36 and by extinguishing the electric arc using simultaneously several methods which include simultaneous cooling by venting and filtering hot gases and squeezing any gaps that can arc by passing the piston 36 into a chamber.

The busbar 2 which is mounted between high voltage battery and the power consumption devices is embedded an first housing 12 and second housing 14 in insulation material. The high voltage-electric line cutter (HV-ELC) device 10 in closed mode allows current flow over the busbar 2 with very low resistance. In the case of a short circuit in the high voltage, HV, system of the vehicle, an external control unit 50 ignites a pyrotechnic propulsion unit in the first housing 12 of the HV-ELC, which then accelerates an insulating piston 36 downwards. The piston 36 separates a part 2C of the busbar 2 at fracture locations 4 and moves between the two busbar stub ends 2A, 2B so that the current flow is interrupted.

The HV-ELC device 10 consists essentially of a busbar 2, a pyrotechnic igniter 30, an insulating piston 36, a first housing 12, a second housing 14 and an optional filter system.

The busbar 2 is designed in such a way that in normal operating mode it conducts the current of the high-voltage system in the vehicle from the high-voltage battery to the HV consumers with a minimum resistance. The main function of the HV-ELC device 10 is the rapid interruption of this circuit after external trigger within less than 2 msec. For this purpose, the pyrotechnic igniter 30 is installed in the first housing 12 of the HV-ELC device 10. The igniter 30 is connected to an external airbag electronic control unit 50 which, in an emergency case, sends a defined ignition signal to the igniter 30. The low-voltage ignition circuit is separated from the high-voltage circuit by the insulating housing of the device 10. The current of the ignition signal melts a wire in the igniter 30, causing a propellant stored in a squib 32 to be ignited in about 0.2-0.3 msec. The propellant can expand into a chamber or space 16 under the igniter 30. A movable piston 36 is mounted directly under the igniter 30. The piston is accelerated downwards by the pressure of the hot gases. The busbar 2 has a reduced cross-section in two places for easier cutting called fracture locations 4. As soon as the accelerated piston 36 impacts on this busbar 2 at this section, it separates this fractured part 2C and pushes it further downwards. At high levels of current, the current continues to flow through an electric arc despite the fact that a part of the busbar 2 has been disconnected. The arc must be extinguished as soon as possible, by extending, cooling and/or squeezing the arc.

The HV-ELC device 10 uses several of these methods. The insulating piston 36 slides between the two busbar stub ends 2A, 2B and thereby moves the center busbar part 2C away from the stub ends 2A, 2B. The arc is lengthened. Due to the tight fit of sides 38 of the piston 36 adjacent the end 37 of the piston and cylinder chamber 18, the arc is "squeezed" down to a small gap. In the piston 36 above the end 37 and sides 38 are blow channels 39 spaced from the outer walls 19 of the chamber 18 directly under the busbar 2C, gas channels 20 for the hot gas are provided as "blow channels". The highly compressed pyrotechnic gas above the piston 36 flows from the blow channel 39 into the exhaust channels 20 laterally under the busbar 2, after cutting the busbar 2 and passing the piston 36 blow channel 39. Since the arc is burning in this area, the arc is "blown" by the gas into the gas channels 20 too. As a result of this lengthening and cooling of the arc, the voltage drop is further increased until the arc is extinguished. Additionally, the highly compressed pyrotechnical gas from the igniter and the metal filter reduce the ionization.

The gas channels 20 in the second chamber 18 can lead to an optional filter area which can be labyrinth-like with at least one chamber with pressure compensation, cooling, deionization and filter functions. The first chamber should be filled with a metal filter for deionization and cooling of the arc. The further chamber(s), see FIG. 8A with 2 chambers and 8B with 3 chambers, can be filled with filter material or cooling material, so that as much energy as possible is extracted from the gas/plasma e.g. by means of electric sublimation upon initiation of the very hot gases (plasma from the arc). The sublimation energy also includes the melting heat in addition to the evaporation energy.

The labyrinth with many deflections also slows down heavy particles by impact on the walls and filters it out before the gas escapes. In particular, evaporated copper is to be precipitated from the busbar on the walls, and not completely combusted hot particles of the propellant are slowed down here so that they are completely combusted within the filter. The filter labyrinth with many deflections also serves to slow down heavy particles by impact on the walls and to filter it out before the gas escapes from the outlet. In particular, evaporated copper is to be precipitated from the busbar on the walls, and not completely combusted particles of the propellant are slowed down here so that they are completely combusted within the filter.

Figure 6:
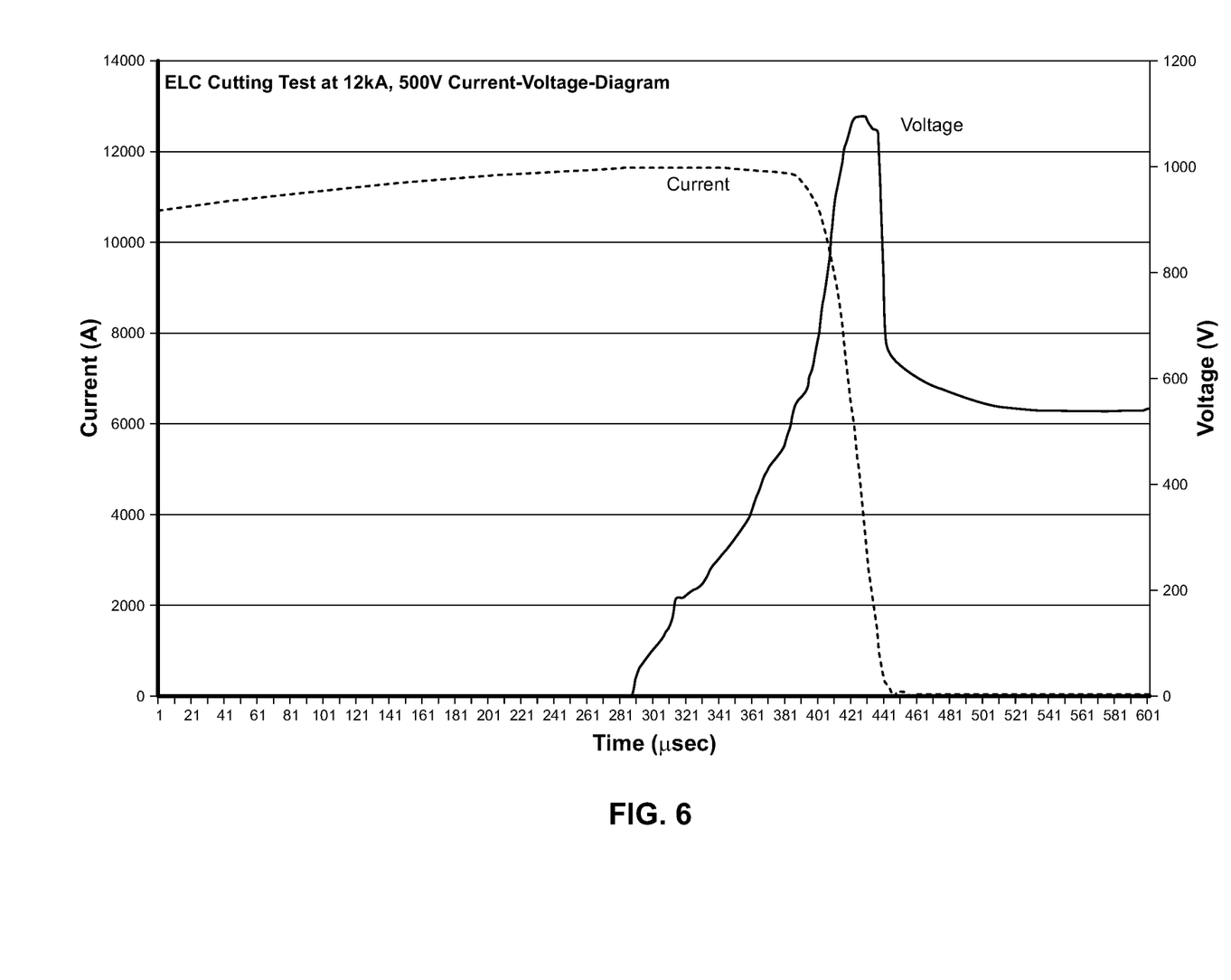
FIG. 6 is a diagram showing the cutting process with voltage and current over time after activation of the device.

The object, as already discussed, of the present invention is to be able to switch off very high currents up to 16 kA and voltages up to 1000 V in a very small space in a very short time <2 msec, as shown in FIG. 6.

The task is solved by a galvanic separation of a busbar 2 using a pyrotechnic device 30, 32, 36 and by extinguishing the electric arc using simultaneously several methods: extension of the arc with simultaneous cooling and squeezing.

Figure 10:
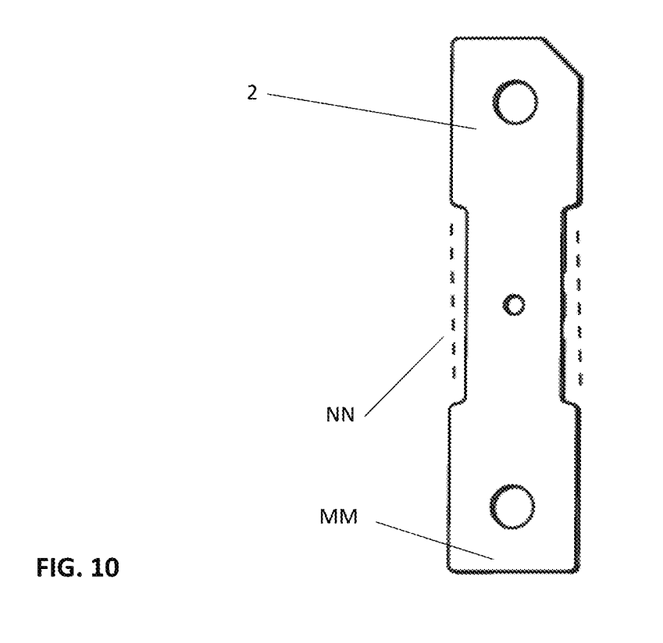
FIG. 10 is a plan view of the bus bar with a preferred shape of the bus bar being generally rectangular with a narrowed center. The phantom lines NN illustrate that the center of the bus bar can be as wide as its opposite ends MM.
Figure 11A:
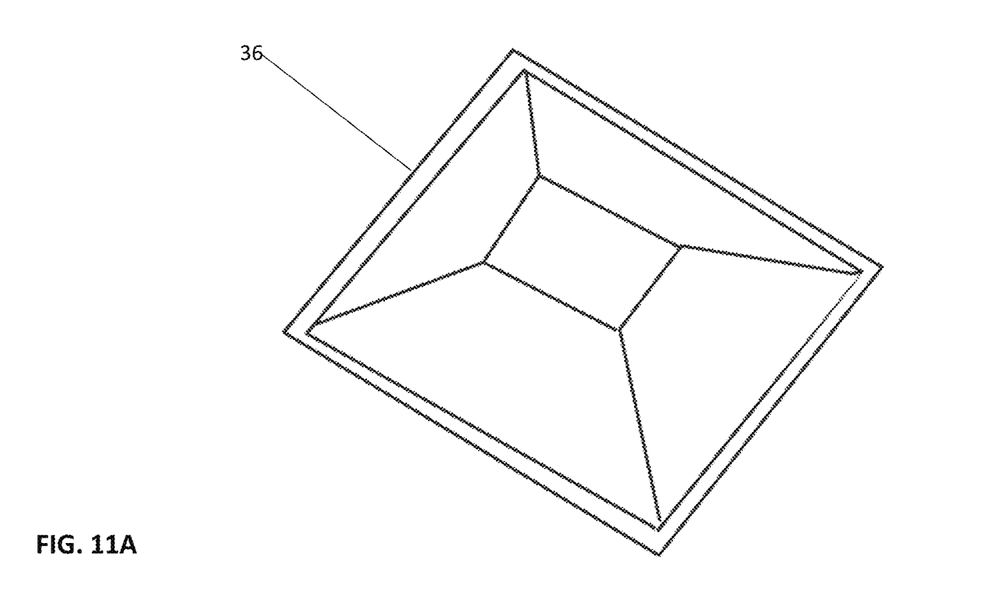
FIG. 11A is an isometric view and 11B is a plan view that diagrammatically illustrate a pyramidal/prism shaped piston with the chamber 16.
Figure 11B:
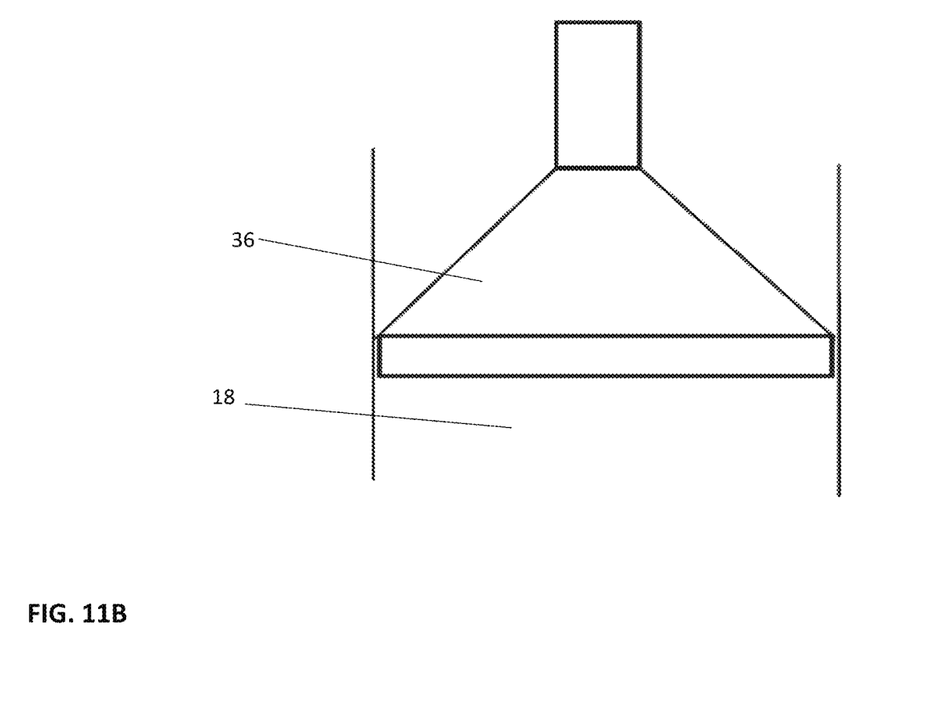

Integrated "blow channels" 20 in the housing and piston support the "blow out" or "blow away" of the electric arc. For this purpose, channels are added in the piston laterally across the width of the busbar, which directs the pyrotechnic gas stream. As soon as the piston 36 has cut the busbar 2 and has reached the exhaust channels 20 below, the emerging electric arc can be blown into the gas outlet channels 20 via the blow channels in the piston. A "squeezing" function for the arc allows a faster arc interruption. The shape of the piston 36 can have different profiles. Different variants of the piston 36 have been tested: one has a round shape without cutting edge, another has a rectangular shape with metal cutting edge. Optional integration of metal arcing plates (not shown) can be placed into the cylinder chamber 18 in the area of the outlet ducts. As well integrated channels inside the piston are considerable to guide the gas from the igniter to the arc plasma right after cutting the busbar. Optionally, an additional metal arc splitter stack shown in FIG. 10 for a higher arc voltage can be placed into the cylinder chamber 18 in the area below the outlet ducts.

Figure 9:
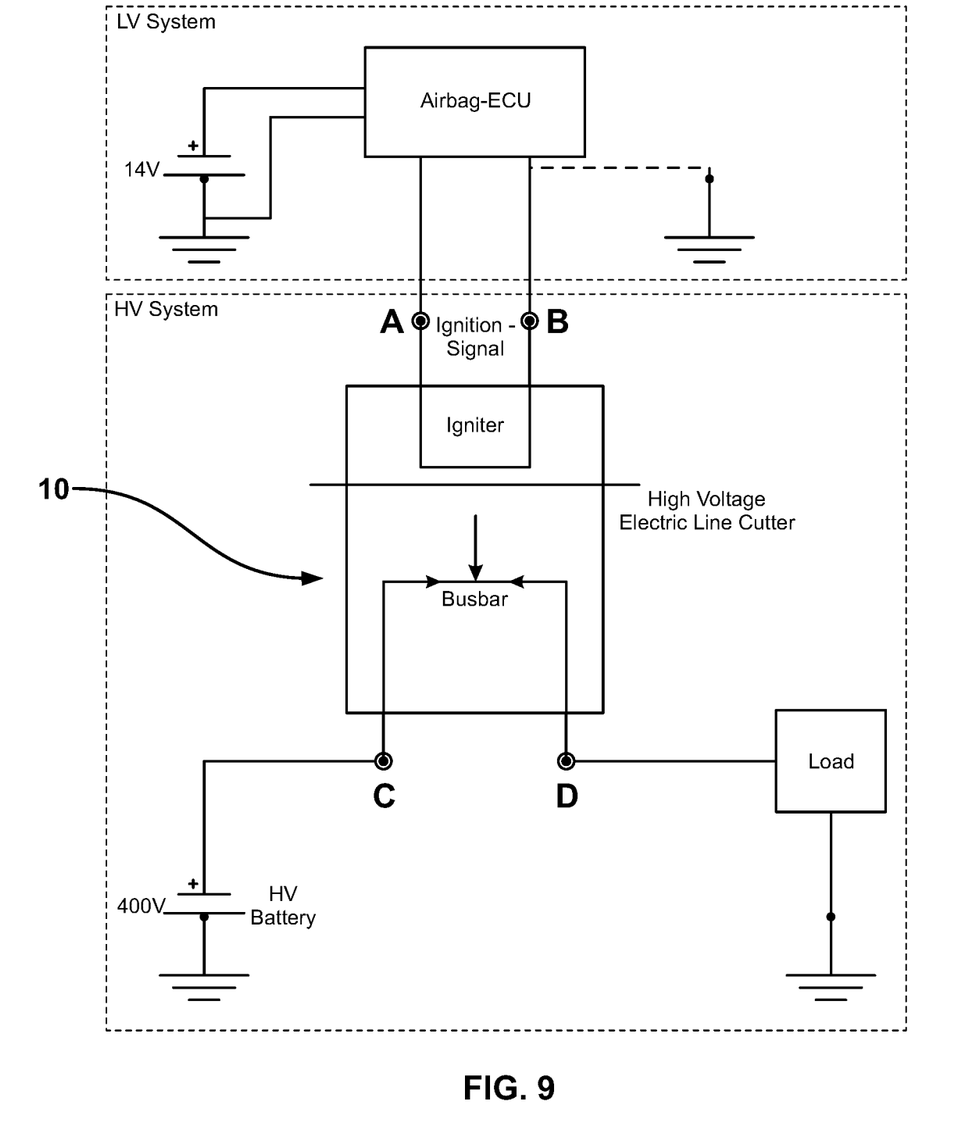
FIG. 9 is an exemplary schematic electric circuit diagram of the device embedded in a vehicle environment.

The piston 36, preferably has an optimized edge profile at the end 37 for the efficient cutting of a part of the busbar 2. The piston 36 on the side can have cutting edges (not shown). This is to facilitate the cutting of the busbar 2. The cutting edges of the piston 36 can be of both plastic and metal. The cutting edges of the piston have a special cutting profile with which it is possible to influence the arc shape and separation, by way of example inverted V-shape with first cutting at the sides and final cutting in the middle of the rail, FIG. 9. The piston 36 has one or more "blowing channels" through which gases can be conducted. The blowing channels can branch and combine. The inlet cross-section and outlet cross-section may be different. The piston 36 at the end 37 has a region which lies flush against the second chamber 18 or cylinder wall and can thus squeezes, hinders or blocks the electric arc in a "squish area". The piston 36 after ignition is guided in a chamber 16 in the first housing 12 and then in a chamber 18 in the second housing 14. The piston 36 can have guide grooves or guide bars or any other guiding profile for the purpose of preventing the twisting or tilting and securing of a correct mounting with the corresponding counter profile for this being in the cylinder, cuboid or prism (not shown).

The first and second cylinder, cuboid or prism chambers 16, 18 can have a guide groove or a guide web or any other guiding profile which corresponds to the piston 36. The piston 36 is securely held in the first housing chamber position until the ignition is triggered, for example a latching lug or a detent projection, FIGS. 4 and 5A.

The second cylinder, cuboid or prism chamber 18 of the second housing 14 has a shape or additional profile for decelerating the piston 36.

Figure 7:
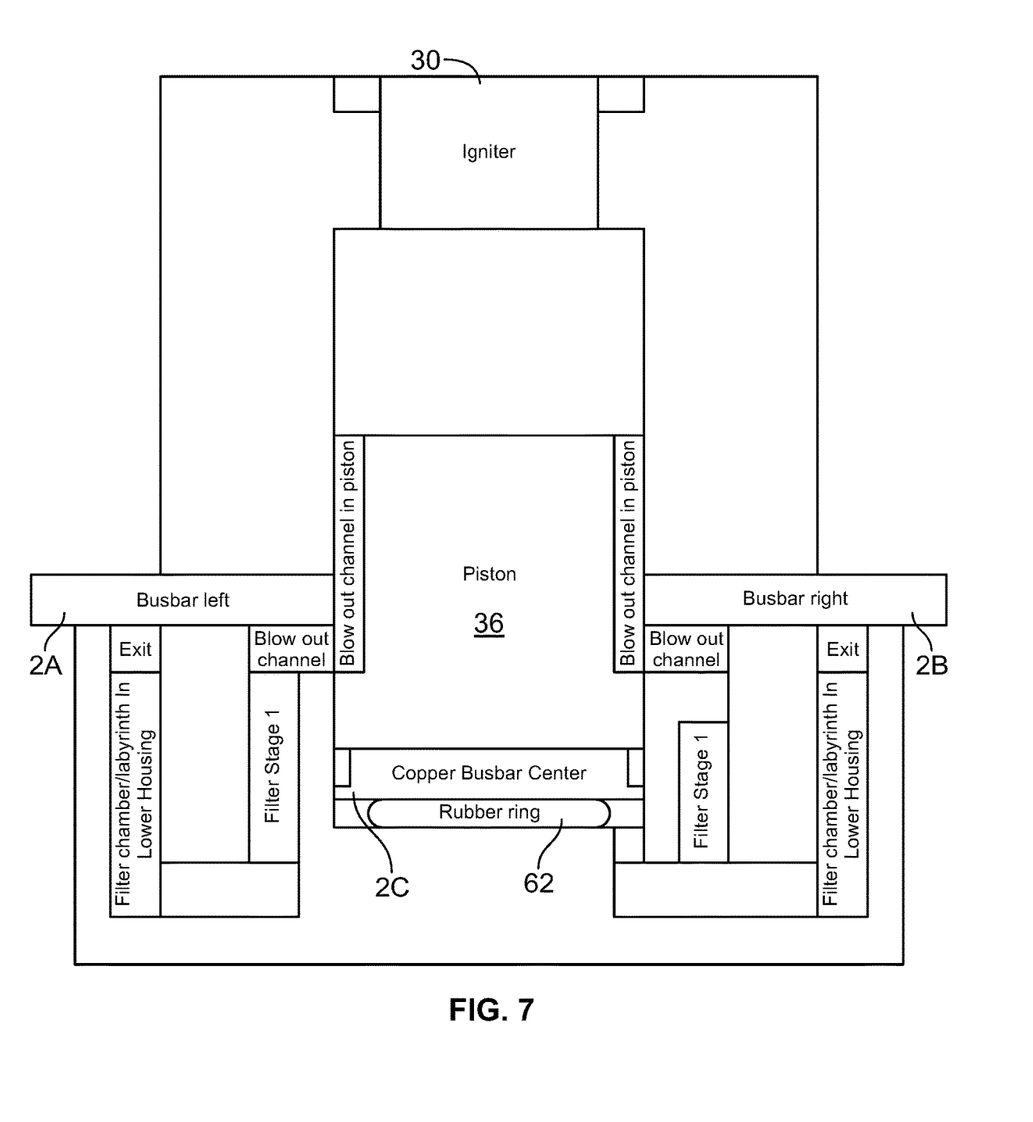
FIG. 7 is a view of the device showing the busbar in the open mode.

This can be: a conical cross-section, narrowed down; embedded braking struts with progressive braking effect by constriction; integrated deformable profiles or ribs 60 in the region of the chamber 18 capable of absorbing the kinetic energy of the piston 36, as shown in FIG. 7. Additional deformation elements on the cylinder bottom, for example in the form of a rubber ring 62 could be used.

The piston 36 has a device with which it can be securely held in the end position—after triggering the ignition, cutting the busbar 2 and reaching the end position (for example a latching lug or a detent projection). The locking profile can also consist of the above-mentioned progressive braking struts, which have a detent projection below which the piston snaps into.

The chamber 18 has a device with which the piston 36 can be securely held in the end position (for example, a profile into which the piston snaps) after triggering the ignition, cutting the busbar 2 and reaching the end position.

The second cylinder chamber optionally has a relief bore, via which the gas compressed during the downward movement of the piston 36 can flow out into the filter region 61 or outwards which is designed or narrowed in such a way that the compressed gas under the piston 36 is used for deceleration and/or impact damping.

The length of the second chamber 18 is designed to be sufficient to interrupt the electric arc and to decelerate the piston 36.

The position and profile of the outlet channels 20 are designed in such a way that the arc can be "blown away" to the outside. This is usually done on both sides directly under the busbar across the width of the busbar 2. The outlet ducts can be closed at the outer end, whereby the material of the wall must be so thin at the end that the wall breaks at increased pressure (break point). The outlet ducts in the second chamber 18 can also be filled with filter material 61 (1st filter stage), preferably made of metal, shown in FIG. 5A.

The filter material 61 below the outlet channels 20 in the second cylinder chamber consists of metal structures with a large surface area so that the hot gases can be better cooled and deionized by the metal. This also improves the arc extinguishing. The density of the filter material 61 in the outlet channels 20 in the second chamber 18 is chosen such that the gas pressure is decelerated in a slowed manner and the exiting gases can be cooled longer.

The second chamber 18 can have one or more metal arcing plates inserted into the wall below the outlet openings.

Figure 8A:
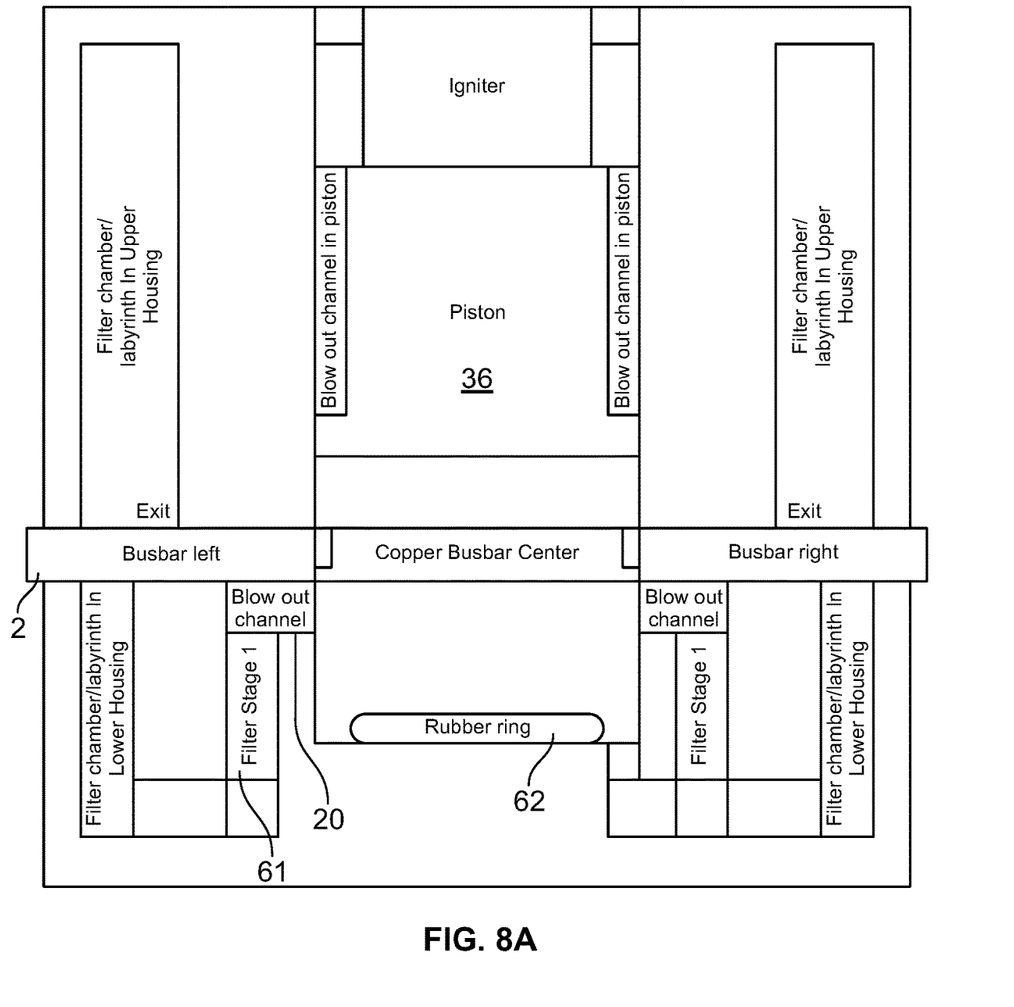
FIG. 8A is a view of the device showing the device with metal filter (filter stage 1) and a second filter stage in standard operation before activation. It is a functional representation for one exemplary use of the device as part of a vehicle crash system.
Figure 8B:
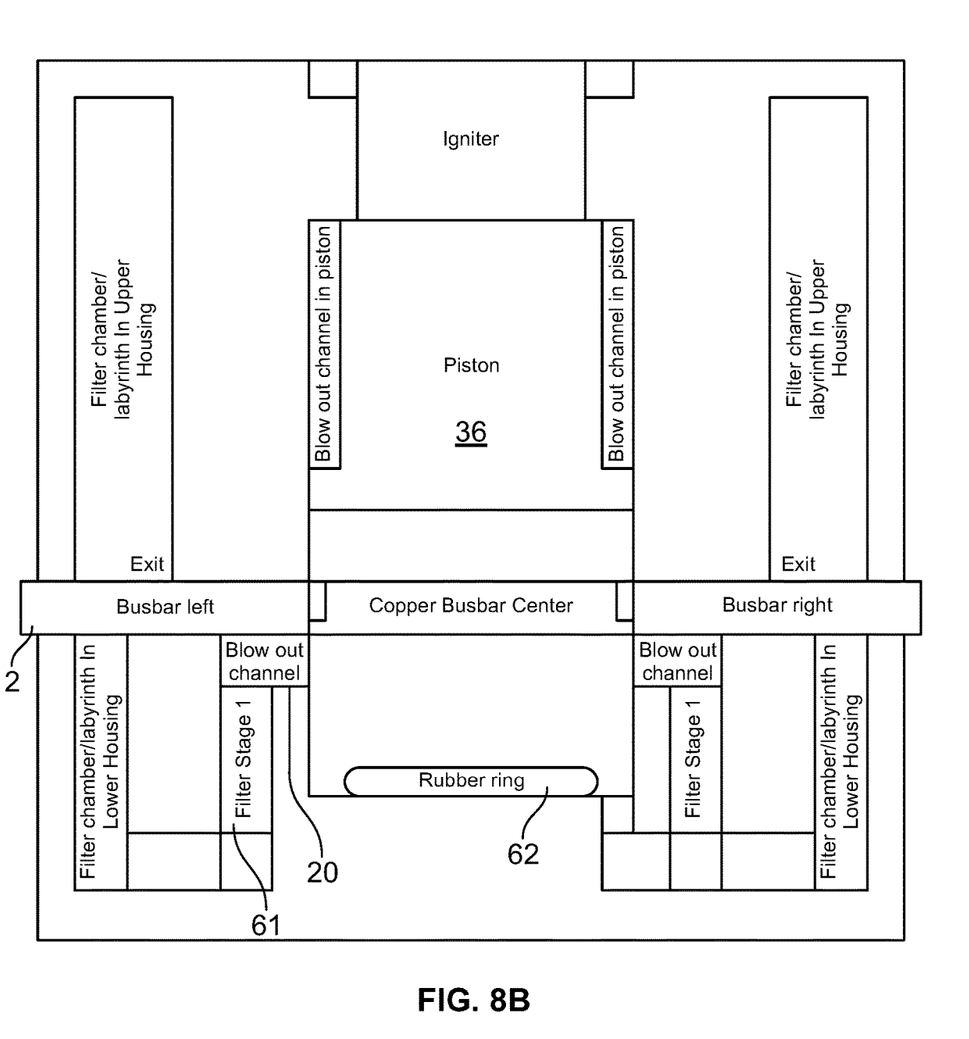
FIG. 8B is a view of the device showing the device with metal filter (filter stage 1) and a second filter stage in the second housing and a third filter stage in the first housing in standard operation before activation. It is a functional representation for one exemplary use of the device as part of a vehicle crash system.

The hot gases can be further filtered and cooled in extended filter areas, (shown in FIG. 8A and FIG. 8B). The filter function can be divided into more than one chamber, FIGS. 8A, 8B. In particular, the two gas streams of the two busbar stub ends 2A, 2B have to be separated by a dividing wall. No gases from the one outlet channel may come together with gases from the other outlet channel within the housings 12, 14 because of the risk of reigniting the electric arc after extinguishing it.

A second filter area shown as a second filter surrounds the second cylinder chamber in a gas-tight manner. The filter area must have at least two separate chambers for the two gas streams. The gas streams of the first filter are introduced into the second filter via their outlet channels in part of the second housing, FIGS. 8A, 8B. A first and second filter surrounds the first and second cylinders in a gas-tight manner, both filters being connected to one another. Both filters must have at least two separate chambers for the two gas streams. A first and second filter are connected to one another in such a way that the gases introduced into the second filter can also be transferred into the first filter without losses. The aim is to use the entire space for the filtration (filter labyrinth) which is not required for stability.

The chambers in the filter can be connected with each other with many deflections. Different filter materials can be used in the filter chambers for different pressures, temperatures and gas velocities. One or more filter compartments can be separated by thin walls, which are only opened by the pressure. The outlet ducts blow off the hot gases from the bottom or top at both sides of the current rail, respectively, directed towards the current rail. The aim is that possibly still present gaseous copper precipitates on the cool current rails and hot gases are further cooled.

By extending and increasing the size of the HV-ELC, it can be adapted to higher currents and voltages.

As previously mentioned, there are several measures for deceleration of the piston: Conical shape in the second housing, which is narrowing down from 18.3 mm below busbar to 17.0 mm on the floor. Then the diameter at the piston edge is about 17.5 mm. This should be sufficient to clamp the piston after shooting. Rounded corners in the second cylinder chamber of the second housing to reduce the notch effect ("break points" during the hard impact of the piston). Brake knobs on the ground to dampen the impact of the piston, FIG. 7. These knobs should be designed in such a way that they remove as much kinetic energy from the piston as possible with deformation. They can be produced during injection molding of the second housing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An electric line cutter device for high voltage busbars comprises:
    a first housing with a first housing chamber;
    a second housing with a second housing chamber, the second housing affixed to the first housing;
    a piston contained inside the first housing chamber;
    an igniter for driving the piston from the first housing chamber to the second housing chamber;
    a busbar for carrying an electric current flow in the busbar rigidly held between the first and second housing and spanning across said first and second housing chambers wherein the busbar has two stub ends extending external of the first and second housings, each of the stub ends configured to be attached to electrical wiring or cable to complete a circuit wherein the busbar extends across the first and second housing chambers held rigidly at the stub ends by a compression force between the first and second housing on two opposed sides of the first and second housing;
    wherein upon igniting the igniter, the piston moves breaking a middle portion of the busbar between the two stub ends, moving the piston and the middle portion of the busbar into the second housing chamber thereby stopping the electric current flow and wherein the busbar, when broken at the middle portion, remains rigidly held at the two opposed sides of the first and second housing at the stub ends of the busbar; and
    wherein the first and second housing are made at least partially non-electrically conductive wherein the piston is at least partially formed as an insulator to prevent electric discharge wherein the piston has an end that impacts and cuts the busbar and a side region which lies flush against the second housing chamber when the piston is moved in a lowest piston position, a space along the side region and the second housing being sufficiently narrow to squeeze, hinder or block any electric arc and wherein the second housing chamber has a length allowing the cut middle portion and the end of the piston to move away from the cut stub ends lengthening the distance to prevent arcing.

2. The electric line cutter device of claim 1 wherein the first and second housing are removably attached to the other by one or more fasteners.

3. The electric line cutter device of claim 1 wherein the busbar further comprises a pair of fracture locations, each fracture location being internal and adjacent to the first and second housings and of a reduced thickness when viewed in a cross-section of the busbar, the fracture location configured to break upon an impact from the piston.

4. The electric line cutter device of claim 1 wherein the igniter is electrically activated in the event of a signal from an Electronic Control Unit (ECU).

5. The electric line cutter device of claim 4 wherein the electric line cutter device is configured to be used in a vehicle capable of generating high voltages.

6. The electric line cutter device of claim 5 wherein the electric line cutter device is activated by the Airbag Electronic Control Unit in the event of a vehicle crash.

7. The electric line cutter device of claim 1 wherein the igniter is a pyrotechnic device and further comprises a propellant charge squib.

8. The electric line cutter device of claim 1 wherein the first or second housing further comprises at least one vent passage extending from inside the second housing chamber below the busbar and externally out through the second housing.

9. The electric line cutter device of claim 1 further comprises at least one filter for cooling and deionization of a gas plasma from an arc and the ignitor and to capture debris generated by the ignitor and during the breaking of the busbar.

10. The electric line cutter device of claim 9 wherein the at least one filter is made of a high temperature resistant material.

11. The electric line cutter device of claim 1 wherein the at least one filter is made of metal, steel or woven steel.

12. The electric line cutter device of claim 8 wherein upon activation, the igniter moves the piston to break the busbar and the piston is configured to create channels in interior surfaces of the first and second housings to guide the gas from the igniter in the chambers to the at least one vent passages below the busbar.

13. The electric line cutter device of claim 12 wherein the channels are first formed respectively between the piston and housings along the interior surfaces of the first and second housing.

* * * * *